United States Patent
Sever et al.

(10) Patent No.: US 8,671,271 B2
(45) Date of Patent: Mar. 11, 2014

(54) SYSTEM, APPARATUS, AND METHOD FOR BIOS LEVEL CONTEXTUAL CONFIGURATION OF RESOURCES

(75) Inventors: Gil Sever, Rosh-Haayin (IL); Pavel Berengoltz, Petah-Tikva (IL); Hay Hazama, Kiryat Ono (IL)

(73) Assignee: Safend Ltd., Tel Aviv (IL)

( * ) Notice: Subject to any disclaimer, the term of this patent is extended or adjusted under 35 U.S.C. 154(b) by 454 days.

(21) Appl. No.: 12/811,172

(22) PCT Filed: Dec. 30, 2008

(86) PCT No.: PCT/IL2008/001696
§ 371 (c)(1),
(2), (4) Date: Sep. 28, 2010

(87) PCT Pub. No.: WO2009/083979
PCT Pub. Date: Jul. 9, 2009

(65) Prior Publication Data
US 2011/0029766 A1 Feb. 3, 2011

Related U.S. Application Data

(60) Provisional application No. 61/006,230, filed on Dec. 31, 2007.

(51) Int. Cl.
*G06F 9/00* (2006.01)
(52) U.S. Cl.
USPC .............................................................. 713/2
(58) Field of Classification Search
USPC ........................................................ 713/1, 2
See application file for complete search history.

(56) References Cited

U.S. PATENT DOCUMENTS

| | | | |
|---|---|---|---|
| 5,598,531 A * | 1/1997 | Hill | 726/24 |
| 5,664,097 A * | 9/1997 | Johnson et al. | 726/16 |
| 6,418,424 B1 | 7/2002 | Hoffberg et al. | |
| 6,769,124 B1 | 7/2004 | Schoening et al. | |
| 7,155,615 B1 * | 12/2006 | Silvester | 713/185 |
| 7,565,549 B2 * | 7/2009 | Satterlee et al. | 713/187 |
| 7,793,136 B2 * | 9/2010 | Lutter | 714/1 |
| 2003/0120918 A1 * | 6/2003 | VanDer Kamp | 713/164 |
| 2007/0150891 A1 | 6/2007 | Shapiro | |
| 2007/0226807 A1 | 9/2007 | Ginter et al. | |
| 2008/0133901 A1 * | 6/2008 | Nijhawan et al. | 713/2 |
| 2008/0163360 A1 * | 7/2008 | Nishida | 726/17 |
| 2011/0154009 A1 * | 6/2011 | Harmer | 713/2 |

FOREIGN PATENT DOCUMENTS

JP 2007241863 A * 9/2007

OTHER PUBLICATIONS

International Search Report for International Application No. PCT/IL08/01696 mailed Apr. 24, 2009.
European Search Report, mailed on Jul. 12, 2012, for EP Application No. 08866201.0.

* cited by examiner

*Primary Examiner* — Kim Huynh
*Assistant Examiner* — Alyaa T Mazyad
(74) *Attorney, Agent, or Firm* — Pearl Cohen Zedek Latzer Baratz LLP

(57) ABSTRACT

A system and method for a contextual control of resources of a computer. A plurality of detection modules may inform a configuration module of context changes and events. A database may store a plurality of configuration parameters and policies. A configuration module may configure a BIOS of a computer according to events, context and configuration policies. Other embodiments are described and claimed.

24 Claims, 1 Drawing Sheet

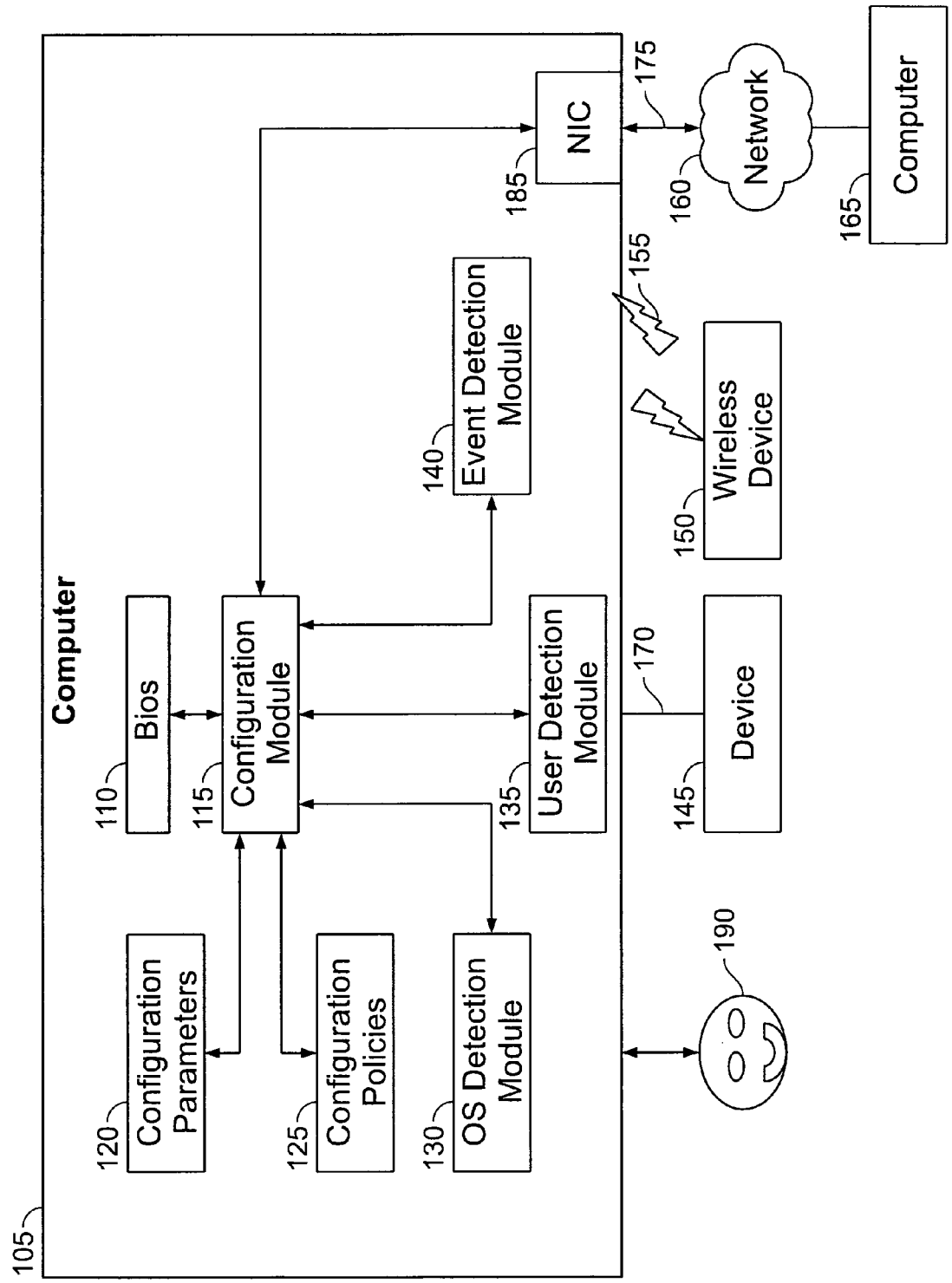

SYSTEM, APPARATUS, AND METHOD FOR BIOS LEVEL CONTEXTUAL CONFIGURATION OF RESOURCES

CROSS-REFERENCE TO RELATED APPLICATIONS

This application is a National Phase Application of PCT International Application No. PCT/IL2008/001696, entitled "System, Apparatus, and Method for Bios Level Contextual Configuration of Resources", International Filing Date Dec. 30, 2008, published on Jul. 9, 2009 as International Publication No. WO 2009/083979, which in turn claims priority from U.S. Provisional Patent Application No. 61/006,230, filed Dec. 31, 2007, both of which are incorporated herein by reference in their entirety.

BACKGROUND OF THE INVENTION

A large and increasing portion of the information handled in today's modern office environment is digital. Many organizations, institutions and establishments store, handle and manipulate most of their information, and/or information associated with their activities, in digital forms. In many cases, such information may include confidential, secret or otherwise sensitive information, which, in the wrong hands, may cause serious damage to the owner or keeper of the information and/or to those associated with the owner and/or keeper of the information.

Uncontrolled information flow, also, is a recognized problem in various industries, organizations and environments. For example, commercial organizations, government agencies, academic institutions and health care facilities may all be at risk of sensitive information being provided to unauthorized, possibly hostile entities.

Much attention has been devoted to devising methods for preventing sensitive information from being copied to, or stored on, removable or other devices. Other counter measures attempt to prevent sensitive information from being communicated, for example, over the internet, or otherwise conveyed, provided or exposed to unauthorized entities. However, one drawback of prior art methods is that they rely, at least to some extent, on an operating system environment. A user may use an alternative, possibly privately owned, operating system to operate a computer and thus possibly bypass security measures that rely on an operating system environment.

SUMMARY OF EMBODIMENTS OF THE INVENTION

Embodiments of the invention may prevent a user from booting a computer from a nonofficial, unauthorized, possibly privately owned, operating system, for example in order to bypass security measures that may be installed by an official and/or default operating system installed.

According to embodiments of the invention, a basic input/output system (BIOS) may be configured such that booting a computer may only be done from a predefined, designated device. According to embodiments of the invention, the BIOS configuration may be changed at various stages of an operation of a computer. For example, during boot time, storage devices other than the device storing the operating system may be disabled. According to embodiments of the invention, devices may further be enabled or disabled according to a user logged onto the computer, an operating system running on the computer, external devices connected to a computer or various events or contexts, for example, a network connectivity or a time of day.

According to embodiments of the invention, a configuration module may configure a BIOS according to information received. For example, various detection modules may detect events and/or gather information pertaining to events or context associated with an operation of a computer. Such detection modules may further communicate information to the configuration module. According to embodiments of the invention, sets of BIOS configuration parameters may be defined and stored on a computer. According to embodiments of the invention, a configuration module may dynamically configure a BIOS according to information received and according to stored BIOS configuration sets.

BRIEF DESCRIPTION OF THE DRAWINGS

Embodiments of the invention are illustrated by way of example and not limitation in the figures of the accompanying drawings, in which like reference numerals indicate corresponding, analogous or similar elements, and in which:

FIG. 1 depicts a schematic block diagram according to embodiments of the invention; and It will be appreciated that for simplicity and clarity of illustration, elements shown in the figures have not necessarily been drawn to scale. For example, the dimensions of some of the elements may be exaggerated relative to other elements for clarity.

DETAILED DESCRIPTION OF THE INVENTION

In the following detailed description, numerous specific details are set forth in order to provide a thorough understanding of the invention. However, it will be understood by those of ordinary skill in the art that the invention may be practiced without these specific details. In other instances, well-known methods, procedures, components, modules, units and/or circuits have not been described in detail so as not to obscure the invention.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. For example, "a plurality of stations" may include two or more stations.

Unless explicitly stated, the method embodiments described herein are not constrained to a particular order or sequence. Additionally, some of the described method embodiments or elements thereof can occur or be performed at the same point in time.

According to embodiments of the invention, a configuration module may configure a basic input/output system (BIOS) according to configuration policies, configuration parameters, events, context and information received from various sources. For example, various detection modules may detect events and/or gather information pertaining to events or context associated with an operation of a computer. Such detection modules may further communicate information to the configuration module. According to embodiments of the invention, BIOS configuration parameters and policies may be defined and stored on a computer or alternatively may be communicated to a computer. According to embodiments of the invention, a configuration module may dynamically configure a BIOS according to events, context and/or information received and according to stored BIOS configuration parameters and policies.

The term "BIOS" used in this patent specification should be expansively construed to include any system, sub-system, library modules, programs or any other suitable configuration entities that may configure various operational and/or functional aspects of resources associated with a computing device. Although basic I/O system (BIOS) is typically used as reference to a plurality of programs, libraries and/or configuration parameters and utilities in a personal computer (PC), as used in this patent specification, a BIOS may be such configuration system and/or sub-system of any computing device to initiate and/or control the resources.

Reference is made to FIG. 1 showing a schematic block diagram according to embodiments of the invention. According to embodiments of the invention, computer 105 may be a personal computer, a desktop computer, a mobile computer, a laptop computer, a notebook computer, a terminal, a workstation, a server computer, a personal digital assistant (PDA) device, a tablet computer, a network computing device, a wireless computing device, a mobile phone, a cellular phone, a smartphone, a pager, a two-way radio or any other suitable computing device. According to embodiments of the invention, computer 105 may comprise BIOS 110. According to embodiments of the invention, BIOS 110 may be configured by an appropriate utility or application. According to embodiments of the invention, BIOS 110 configuration and parameters may determine, among other things, availability and/or functionality of a variety of resources. An illustrative, non-exhaustive list of such resources may be I/O devices, such as, but not limited to, keyboards, mice and/or other point and click devices, displays, storage devices such as disks and/or removable media, serial, parallel and/or peripheral component interconnect (PCI) interfaces and/or devices such as network interface devices and/or wireless communication devices.

According to embodiments of the invention, computer 105 may comprise configuration module 115. According to embodiments of the invention, configuration module 115 may read, or otherwise receive, information and/or configuration parameters from BIOS 110. According to embodiments of the invention, configuration module 115 may further configure BIOS 110, for example, configuration module 115 may provide BIOS 110 with various configuration parameters that may determine, alter or otherwise effect operational and/or functional aspects of BIOS 110.

According to embodiments of the invention, configuration module 115 may receive configuration parameters from parameters storage 120. According to embodiments of the invention, parameters storage 120 may reside on computer 105. For example, configuration parameters may be stored on storage media such as, but not limited to, a read only memory (ROM), a dynamic random access memory (DRAM), an electrically erasable programmable read-only memory (EEPROM), a non-volatile storage chip or a hard drive, removable media, a USB storage device or a FLASH storage device. According to embodiments of the invention, configuration module 115 may further store configuration parameters in parameters storage 120, for example, configuration parameters sets may be stored in parameters storage 120, possibly by configuration module 115, in order to be used by configuration module 115. Some exemplary configuration parameters will be described below. According to embodiments of the invention, configuration module 115 may be a distributed module running as a bootstrap loader, a boot loader application or as part of running a protected OS or other stages.

According to embodiments of the invention, configuration module 115 may receive configuration policies from policies storage 125. According to embodiments of the invention, policies storage 125 may be stored on computer 105. For example, configuration policies may be stored on storage media such as, but not limited to, a read only memory (ROM), a dynamic random access memory (DRAM), an electrically erasable programmable read-only memory (EEPROM), a non-volatile storage chip or a hard drive, removable media, a USB storage device or a FLASH storage device. According to embodiments of the invention, configuration module 115 may further store configuration policies in policies storage 125, for example, configuration policies may be stored in policies storage 125, possibly by configuration module 115, in order to be used by configuration module 115. Some exemplary configuration policies will be described below.

According to embodiments of the invention, computer 105 may comprise operating system (OS) detection module 130. According to embodiments of the invention, module 130 may detect one or more OS instances running on computer 105. For example, computer 105 may host an operating system such as, but not limited to, a Windows™, Windows CE™, Linux, Palm OS™, Solaris™, MAC OS™, a micro kernel or any other suitable OS. According to embodiments of the invention, module 130 may detect one OS when only one OS may be present, or operational on computer 105 or module 130 may detect more than one OS when a plurality of OSs are running on computer 105. For example, multiple guest operating systems in a virtual machine (VM) environment. According to embodiments of the invention, module 130 may communicate to configuration module 115 information pertaining to one or more OSs operating or present on computer 105. According to embodiments of the invention, module 130 may communicate various parameters pertaining to an OS detected on computer 105, for example, an OS version, OS operating mode and/or any other applicable OS configuration parameters. According to embodiments of the invention, module 130 may run as a bootstrap loader, and/or as a boot loader application and may further allow or prevent loading of unauthorized and/or unprotected OSs.

According to embodiments of the invention, user 190 may be associated with computer 105. According to embodiments of the invention, user 190 may be logged onto computer 105. For example, user 190 may be logged onto computer 105 through a console directly attached to computer 105 or user 190 may be logged onto computer 105 through a network connection, for example, through network 160 over network connection 175. According to other embodiments of the invention, association of user 190 with computer 105 may be through applications that run on computer 105 on behalf of user 190. For example, a periodic application, program or script may be executed on behalf of user 190. Such application may be executed regardless of whether or not user 190 is logged onto computer 105. Such application, program or script may still be associated with user 190, for example, such application may assume, for the duration of execution, permissions, security levels and/or other various parameters associated with user 190. Alternatively, association of user 190 with computer 105 may be through a remote execution of an application, for example, user 190 may be using remote procedure call (RPC) from computer 165 in order to execute an application on computer 105.

According to embodiments of the invention, network 160 may be a private IP network, an integrated services digital network (ISDN) line, a frame relay connection, a modem connected to a phone line or a public switched telephone network (PSTN), private data network, a local area network (LAN), an enterprise intranet or any other suitable communication means or combination of the preceding. According to embodiments of the invention, network connection media 175 and network interface card (NIC) 185 may be such that network connectivity of computer 105 to network 160 may be enabled and may be operational.

According to embodiments of the invention, computer 105 may comprise user detection module 135. According to embodiments of the invention, module 135 may detect one or more users associated with and/or operating computer 105. For example, module 135 may detect a user's login onto computer 105. According to embodiments of the invention, module 135 may further obtain, and communicate to configuration module 115, various parameters and information pertaining to a user associated with computer 105. For example, module 135 may detect permission and/or authorization parameters pertaining to a user associated with computer 105. According to embodiments of the invention, information pertaining to a user associated with computer 105 that may be obtained by module 135 may be user identification information, user's group information, user's passwords, user's privileges, user's permissions and/or any other relevant information pertaining to a user associated with computer 105. Other information that may be obtained by module 135 may be behavioral aspects and/or patterns associated with a user. For example, according to embodiments of the invention, module 135 may collect and/or otherwise obtain information pertaining to content and/or information accessed by a user associated with computer 105, or applications executed by that user.

Other examples of information that may be gathered by module 135 may be time patterns. For example, hours of the day of days of the week on which a user performs various actions relating to computer 105. According to embodiments of the invention, any information associated with a user that is directly or indirectly operating computer 105 may be obtained by module 135. According to embodiments of the invention, any information obtained by user detection module 135 may be communicated by module 135 to configuration module 115.

According to embodiments of the invention, computer 105 may comprise event detection module 140. According to embodiments of the invention, module 140 may detect one or more events. According to embodiments of the invention, module 140 may detect, or be informed of an occurrence of an event and may further obtain information pertaining to and/or associated with the event. According to embodiments of the invention, module 140 may further communicate an indication of an event and information pertaining to an event to configuration module 115. For example, module 140 may detect and report events such as, but not limited to, a change of state or mode of a network connection, a change of state or mode of a device connection, an idle time period exceeding a predefined limit, an access attempt to a specific information object stored in a specific storage location, a storage capacity limitation exceeded, a shutdown sequence initiation, a restart or reboot procedure initiation, or an application or program access violation. According to embodiments of the invention, event detection module 140 may be configured to detect any applicable event. According to embodiments of the invention, event detection methods and parameters may be configured and used by module 140 in order to detect preconfigured events. According to embodiments of the invention, information to be obtained and communicated when an event is detected may also be configured.

According to embodiments of the invention, computer 105 may comprise network interface card (NIC) 185. NIC 185 may enable computer 105 to communicate, for example, over network connection 175 and network 160 with other computing or network devices. For example, computer 105 may communicate with computer 165. According to embodiments of the invention, computer 165 may be a computer similar to computer 105 as described above. According to embodiments of the invention, computer 105 may further be connected to one or more wired and/or wireless devices. For example, computer 105 may be connected to wired device 145 over wired connection 170. According to embodiments of the invention, device 145 may be, for example, an internal or external hard drive, a removable media device, a universal serial bus (USB) device, an input/output (I/O) device, for example, a keyboard, a mouse or a display, a network interface card, a FLASH storage device, a peripheral component interconnect (PCI) compatible device, cellular telephone, a personal digital assistant (PDA), a serial or parallel device or any other device that may be connected to computer 105.

It should be noted that alterations or permutations such as modifications or additions to some of the modules described above or omissions from some of the modules described above may be made without departing from the scope of the invention. For example, the operations and/or functionalities of some or all modules 115, 120, 125, 130, 135 and 140 may be performed by more, fewer, or other modules. For example, some of the modules described above may be combined into a single module. Additionally, the operations of the above described modules may be performed using any suitable logic comprising software, hardware, other logic or any combinations of the preceding, without departing from the scope of the invention.

According to embodiments of the invention, computer 105 may comprise wireless connection capabilities, for example antenna 155. According to embodiments of the invention, computer 105 may communicate, using antenna 155 with devices such as wireless device 150. According to embodiments of the invention, device 150 may be any wireless device. For example, device 150 may be a wireless PDA device, a bluetooth device, a WiFi device an IrDA device or any other suitable, wireless device.

According to embodiments of the invention, a policy may be defined for a boot sequence of computer 105. According to embodiments of the invention, a policy may define that various devices and/or resources will be unavailable or only partly available during various phases of a boot sequence. For example, many PCs are configured such that hitting a specific key (typically the "Esc" or escape key) during a predefined period of time in the boot sequence will invoke a BIOS configuration utility. Accordingly, a policy may dictate that human interface devices (HID) such as a keyboard or a mouse connected to computer 105 will not be operable by a user during predetermined phases of a boot sequence. Such policy may disable a user from operating a BIOS configuration utility by, for example, pressing a predefined key. According to embodiments of the invention, a policy may enable an operation of HID such as keyboard or point and click devices only after an OS is detected.

According to embodiments of the invention, other policies may be defined for a boot sequence of computer 105. According to embodiments of the invention, a policy may dictate that no storage device other than an internal disk (not shown) connected to computer 105 will be available to an operator or user of computer 105 unless a predefined operating system is detected. Such configuration may disable a user from booting computer 105 from an alternative, possibly private OS. For example, a user may attempt to boot computer 105 from an operating system stored on a compact disk (CD) or floppy disk, doing so may enable a user to bypass security measures that may be in place when a designated, known OS, possibly stored on an internal disk of computer 105 is running. For example, access to various files on various storage devices may be restricted by the OS stored on an internal disk of computer 105. However, such restrictions may be bypassed by booting computer 105 from an alternative OS. According to embodiments of the invention, such booting from an alternative device or media may be disabled. According to embodiments of the invention, devices and/or ports such as, but not limited to, a floppy drive, a CD drive, a USB port or other devices, ports and/or interfaces may be enabled only after a known OS is running on computer 105, for example, a known version of a Linux operating system or a known version of a MAC OS™, possibly accompanied by a known license. According to embodiments of the invention, a module running under a protected OS may perform a verification that security configurations and/or other aspects are according to a predefined policy and/or parameter set.

According to embodiments of the invention, policies stored in policies storage 125 and configuration parameters stored in parameters storage 120 may relate to users. According to embodiments of the invention, policies and parameters may define availability of resources of computer 105 according to the user operating computer 105. For example, user detection module 135 may inform configuration module 115 that user A has logged onto computer 105. According to embodiments of the invention, user detection module 135 may further inform configuration module 115 that user A belongs to users group G1, where G1 may be a group of non-privileged users. According to embodiments of the invention, configuration module 115 may retrieve information and parameters from parameters storage 120 and policies storage 125 in order to determine what resources may be enabled for user A of group G1 and configure resources of computer 105 accordingly. For example, a configuration policy may determine that users belonging to group G1 may not surf the internet, or generally connect to network 160 using computer 105. Accordingly, configuration module 115 may configure BIOS 110 such that NIC 185 will be unavailable, hence disabling network connection while a user from group G1 is logged onto computer 105, e.g. user A.

Alternatively, According to embodiments of the invention, user detection module 135 may inform configuration module 115 that user B has logged onto computer 105. User detection module 135 may further inform configuration module 115 that user B belongs to users group G2, where G2 may be a group of privileged users. According to embodiments of the invention, configuration module 115 may retrieve information and parameters from parameters storage 120 and policies storage 125 in order to determine what resources may be enabled for user A of group G1 and configure resources of computer 105 accordingly. For example, a configuration policy may determine that users belonging to group G2 may surf the internet, or generally connect to network 160 using computer 105. Accordingly, configuration module 115 may configure BIOS 110 such that NIC 185 will be available, hence enabling network connection while a user from group G2 is logged onto computer 105, e.g. user B.

According to embodiments of the invention, policies or configuration parameters may be defined in association with connected devices. For example, a policy, possibly stored in policies storage 125 may impose restrictions on availability of resources according to device types connected to computer 105. For example, device 145 may be a personal digital assistant (PDA) device. According to embodiments of the invention, policies storage 125 may contain a policy that states that internal disk H (for example, one of three internal disks, not shown) will become unavailable if a PDA is connected to computer 105. For example, in order to disable copying of restricted information from disk H to a connected PDA. According to embodiments of the invention, event detection module 140 may detect that connection to device 145 (a PDA according to the current example) has been established. Detection module 140 may further inform configuration module 115 that the device connected is a PDA. According to embodiments of the invention, configuration module 115 may query policies storage 125 and retrieve a policy pertaining to PDA devices. According to embodiments of the invention, configuration module 115 may further retrieve, possibly based on the policy already retrieved, configuration parameters from parameters storage 120 and configure BIOS 110 accordingly. According to embodiments of the invention, if the policy and parameters retrieved by configuration module 115 restrict access to disk H when a PDA is connected to computer 105 then the result of the configuration of BIOS 110 in this example may be an exclusion of disk H from the list of available devices, namely, disk H may be inaccessible while device a PDA is connected to computer 105.

According to embodiments of the invention, a privileged user may override configurations applied by the system. For example, in the previous example, although the system may have restricted access to disk H while a PDA is connected to computer 105, a user in possession of a predefined password may override this restriction. According to embodiments of the invention, such user, possibly after providing a predefined password, may apply a predefined configuration to BIOS 110, namely, cause a predefined configuration to be extracted by configuration module 115 from policies storage 125 and/or parameters storage 120 and further applied to BIOS 110.

According to embodiments of the invention, configuration policies may be time driven. For example, a configuration policy may state that network connectivity will be disabled from 09:00 PM till 08:00 AM. Such configuration may disable users from using computer 105 for personal web surfing during nonworking hours. According to embodiments of the invention, event detection module 140 may detect the change of time from 08:59 PM to 09:00 PM and from 07:59 AM to 08:00 AM and inform configuration module 115 of such event. According to embodiments of the invention, upon being notified of such event, configuration module 115 may extract policy and parameters from the appropriate modules and apply the appropriate configuration to BIOS 110. For example, such configuration may disable NIC 185.

According to embodiments of the invention, applying a configuration to BIOS 110 may be event driven. An illustrative, non-exhaustive list of events that may cause applying of a configuration to BIOS 110 may be an execution of a predefined application, an idle exceeding a predefined limit or threshold, a network connectivity being established, an attempt to access a specific information object stored in a specific storage location, an input from an application or a configuration change of a device. For example, detection module may comprise a blacklist of applications, accordingly, policies storage module 125 may contain configuration policies associated with such blacklisted applications. For example, if a predefined application is executed then connection to wireless device 150 and network 160 may be disabled, possibly by disabling NIC 185. for example, if the predefined application is a known worm application. According to embodiments of the invention, an invocation of an application included in such blacklist is may be detected by event detection module 140. As described above, module 140 may inform module 115 of the event, possibly supplying further information pertaining to the invoked application. According to embodiments of the invention, module 115 may extract an appropriate configuration and apply the extracted configuration to BIOS 110 thus applying the appropriate configuration to computer 105, in this example, possibly preventing a worm from spreading to other computers in an organization.

According to embodiments of the invention, event detection module 140 may detect inactivity by tracking time elapsing between keyboard key strokes, time elapsing between mouse movements and/or clicks or an activation of a screen saver. According to embodiments of the invention, a policy may define that various devices and/or resources associated with computer 105 may be disabled if a user inactivity time exceeding some predefined threshold is detected. Such policy may prevent an unattended computer from being used by, for example, users who may log into the computer over a network connection. According to other embodiments of the invention, event detection module 140 may detect an idle time exceeding a predefined threshold. As described above, such event may be reported to configuration module 115 that may further apply a configuration according to predefined configuration parameters. For example, access to internal disks, network connections and/or devices such as device 145 may be disabled as a result of an idle time event detection.

According to embodiments of the invention, detection module 140 may be configured to receive information from various applications. For example, detection module 140 may receive information from an antivirus application. According to embodiments of the invention, an antivirus application may inform event detection module 140 that a virus has been detected on computer 105. According to embodiments of the invention, detection module 140 may inform configuration module 115 of such event. According to embodiments of the invention, upon receiving such notification, configuration module 115 may extract an appropriate configuration from policies storage 125 and/or parameters storage 120 and further apply the extracted configuration to BIOS 110. For example, in accordance with the above example, access to network 160 may be disabled (possibly by disabling NIC 185), access to wireless device 150 may be disabled (possibly by disabling antenna 155, a radio frequency (RF) device or a radio module), and access to any internal disks may also be disabled. According to embodiments of the invention, such disablements may be accomplished by appropriate configuration of BIOS 110 and may further prevent a virus from spreading in an organization.

According to embodiments of the invention, other than a configuration change, a policy stored in policies storage 125 may define further actions to be performed upon a detection of an event. For example, a policy may define a class of events that may cause embodiments of the invention to apply a highly restrictive configuration to BIOS 115 (e.g. a configuration that disables most or all resources of computer 105) and further define an action, for example a shutdown of computer 105. For example, a predefined number of attempts to login to computer 105 using wrong password and/or user name may cause embodiments of the invention to apply to BIOS 110 a configuration that disables all or most of computer 105 resources (note that this configuration may be in place next time computer 105 is rebooted) and to further shut computer 105 down.

According to embodiments of the invention, a log may be created and used to record events. For example, configuration module 115 may record in a log file any or some configuration changes applied to BIOS 110. According to embodiments of the invention, such log may be communicated periodically, upon request, or upon an occurrence of a predefined event, for example, configuration module 115 may communicate the log file to a predefined recipient list or configuration module 115 may alert an administrator upon an occurrence.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

What is claimed is:

1. A method of configuring a basic input/output system (BIOS) controlling at least one resource of a computer comprising:
   configuring the BIOS according to a first set of configuration parameters, the first set of configuration parameters defining that a resource controlled by the BIOS is unavailable;
   detecting an event and based on information pertaining to the event, configuring said BIOS according to a second set of configuration parameters, wherein the second set of parameters defines that the resource is available.

2. The method of claim 1, further comprising:
   configuring said BIOS according to a third set of configuration parameters associated with a user operating said computer.

3. The method of claim 1, wherein said event comprises a change in a state of connection of said computer to a device.

4. The method of claim 3, wherein said device is selected from the group consisting of: a storage device, a network communication device, an input device, an output device, and an authentication device.

5. The method of claim 1, wherein said event comprises a change of a state of connection of said computer to a communication network.

6. The method of claim 1, wherein said event comprises execution of an application on said computer.

7. The method of claim 1, further comprising shutting down said computer based on said event.

8. The method of claim 1, wherein said event comprises an attempt to access a storage device to retrieve a predefined information object stored therein.

9. The method of claim 8, wherein said access is selected from a group consisting of: read, write, copy, modify, delete, move, duplicate, concatenate, and overwrite.

10. The method of claim 1, wherein said event comprises lapse of a predefined time duration during which no interaction of a user with said computer is detected.

11. A computer apparatus comprising:
    a storage having stored thereon BIOS executable code and a plurality of BIOS configuration parameters;

a configuration module to configure said BIOS executable code according to a first set of configuration parameters defining that a resource controlled by the BIOS is unavailable; and an event detection module to detect an event and to further communicate to said configuration module information pertaining to said event based on said detection, wherein said configuration module is to configure said BIOS executable code according to a second set of configuration parameters defining that the resource is available based on said information communicated by said event detection module.

12. The computer apparatus of claim 11, wherein said event comprises a change in a state of connection of said computer to a device.

13. The computer apparatus of claim 11, wherein said device is selected from the group consisting of: a storage device, a network communication device, an input device, an output device, and an authentication device.

14. The computer apparatus of claim 11, wherein said event comprises a change of a state of connection of said computer to a communication network.

15. The computer apparatus of claim 11, wherein said event comprises execution of an application on said computer.

16. The computer apparatus of claim 11, further comprising shutting down said computer based on said event.

17. The computer apparatus of claim 11, wherein said event comprises an attempt to access a storage device to retrieve a predefined information object stored therein.

18. The computer apparatus of claim 17, wherein said access is selected from a group consisting of: read, write, copy, modify, delete, move, duplicate, concatenate, and overwrite.

19. The computer apparatus of claim 11, wherein said event comprises lapse of a predefined time duration during which no interaction of a user with said computer is detected.

20. The computer apparatus of claim 11, wherein said plurality of BIOS configuration parameters are stored in a configuration parameter database.

21. The computer apparatus of claim 11, further comprising a plurality of configuration policies, wherein said configuration module is to configure said BIOS executable code according to at least one of said plurality of BIOS configuration parameters selected based on a configuration policy selected from said plurality of configuration policies.

22. The computer apparatus of claim 11, further comprising a user detection module to identify a user operating said computer apparatus and to communicate to said configuration module information pertaining to said user, wherein said configuration module is to configure said BIOS executable code based on said information communicated by said user identification module.

23. The computer apparatus of claim 11, wherein the configuration module is to configure said BIOS according to a configuration policy, wherein according to the configuration policy a resource is unavailable unless a predefined operating system is detected.

24. The computer apparatus of claim 11, wherein the configuration module is to configure said BIOS according to a configuration policy, wherein according to the configuration policy no storage devices other than an internal disk connected to the computer is available to an operator of the computer unless a predefined operating system is detected.

* * * * *